Nov. 25, 1969     M. CICOGNANI     3,479,892

V-BELT

Filed March 1, 1968

INVENTOR
MARIO CICOGNANI

BY *Stevens, Davis, Miller & Mosher*
ATTORNEYS

United States Patent Office 3,479,892
Patented Nov. 25, 1969

3,479,892
V-BELT
Mario Cicognani, Milan, Italy, assignor to Pirelli S.p.A., Milan, Italy
Filed Mar. 1, 1968, Ser. No. 709,729
Claims priority, application Italy, Mar. 23, 1967, 14,042/67
Int. Cl. F16g 1/12, 5/10, 5/16
U.S. Cl. 74—233      7 Claims

ABSTRACT OF THE DISCLOSURE

A durable V-belt comprising in sequence, from the larger base to the smaller base, a relatively rigid elastomeric layer, a core layer of reinforcing cord elements, a relatively rigid rubber layer having a hardness greater than 65 Shore degrees, and a softer rubber bottom layer which has good resistance to tearing. The above elements are preferably enclosed in a cover of rubberized fabric.

---

The present invention relates to a highly efficient and durable V-belt. The recent trend in the design of driving systems employing V-belts aims at a better exploitation of available space and at the greatest possible reduction of weight of the system. This has led manufacturers to seek belts having better performance characteristics so that either the total number of belts in the driving system may be reduced or belts of smaller size may be employed. The belts utilized must of course have wear qualities equal to or better than the wear qualities of conventional belts already in use.

It has been proposed to employ in the belts resistant inserts of textile materials having a high specific resistance, for example, high tenacity rayon or polyester fibers. It has also been proposed to increase the rigidity and compactness of the belts so that under the highest operating stresses they do not excessively penetrate into their respective races with a consequent reduction of their service life. The use of stronger and more rigid materials, both in the wear resistant cores and in the bodies of the belts, has enabled the construction of belts suitable for the transmission of high power loads. However, the use of such materials has made the problem of obtaining a satisfactory service life for the belts more critical, particularly in some specific applications. In fact, such use of textile materials and of elastomeric compositions having greater rigidity results in an increased heating of the belt during operation due to heat generated on account of hysteresis of the material. Consequently, there is more rapid wear and degradation of the material, particularly of the elastomeric composition constituting the body of the belt. This causes a reduction in the useful life of the belt. The above drawbacks are particularly serious in applications where the working conditions tend to enhance the above mentioned heating phenomenon, for example, systems where the belts are located in rooms maintained at a temperature higher than normal room temperature, or belts used in motor vehicles. In the latter case, these problems are particularly acute in view of the trend in the motor vehicle industry to obtain the greatest possible space saving and the highest possible number of rotations in driving systems constituted by the engine, dynamo and fan of the vehicle. The reduction in the overall dimensions of the belt necessitates the use of the above mentioned more rigid materials, with a consequent increase in the problem of excessive heating of the belt, and use at a high rate of rotation also tends to shorten the belt life.

For any type of belt, the life of the belt depends on the frequency at which it is subjected to various stresses. An increase in the rate of rotation, consequently shortens the belt life. Moreover, taking into account the greater hysteresis resulting from the use of more rigid materials, either textile inserts or more rigid rubber compositions; it will be appreciated that the problem of obtaining a long service life for belts in the driving systems of present day motor vehicles is of considerable industrial concern. Furthermore, considering that in some types of motor vehicles, the belts when operating are subjected to high temperature, either due to the particular position of the engine relative to the belt, or because the pulleys are in contact with high temperature elements; it is apparent that in such cases the problem of a suitable belt life is particularly critical.

When using conventional V-belts, the main cause of their unsatisfactory service life in the above described applications is the formation of cracks along the smaller base of the belt. These cracks rapidly grow along the body of the belt as far as the resistant core elements, thus giving rise to cracks and ruptures of the various parts of the belt.

It is a principal object of the present invention to provide a more durable V-belt which eliminates or minimizes the above described drawbacks, and which has good performance characteristics.

The invention relates to a durable V-belt which comprises in sequence, from its larger base to its smaller base, a portion constituted by an elastomeric composition which preferably has a high resistance, a core constituted by cords made of strands of suitable textile fibers, metal wires or glass fibers, and a body portion formed by two abutting layers separated by a surface parallel to the bases of the belt. The abutting layers include an inner layer adjacent to the core constituted by an elastomeric composition having a considerable hardness, higher than 65 Shore degrees, and a layer which forms the smaller base of the belt constituted by an elastomeric material having good resistance to tear and a hardness lower than 65 Shore degrees, the difference in the hardness of the inner layer and the more resilient layer being at least 10 Shore degrees. Preferably the belt also includes an external cover constituted by one or more layers of rubberized fabric.

Other objects, features and advantages of the invention will become more apparent from the following detailed description when taken in conjunction with the drawings in which.

Figure 1:
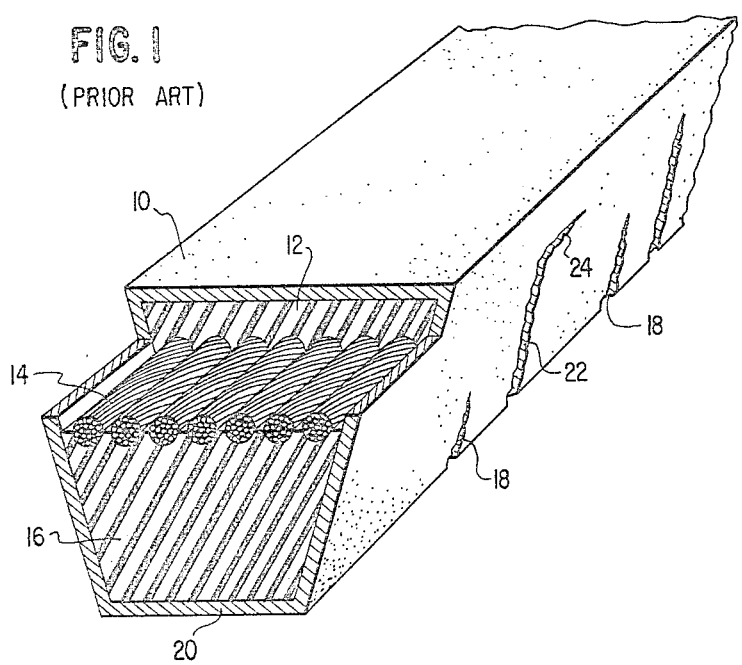
FIGURE 1 is a perspective view in a section of a conventional belt illustrating the formation and propagation of cracks in the belt.
Figure 2:
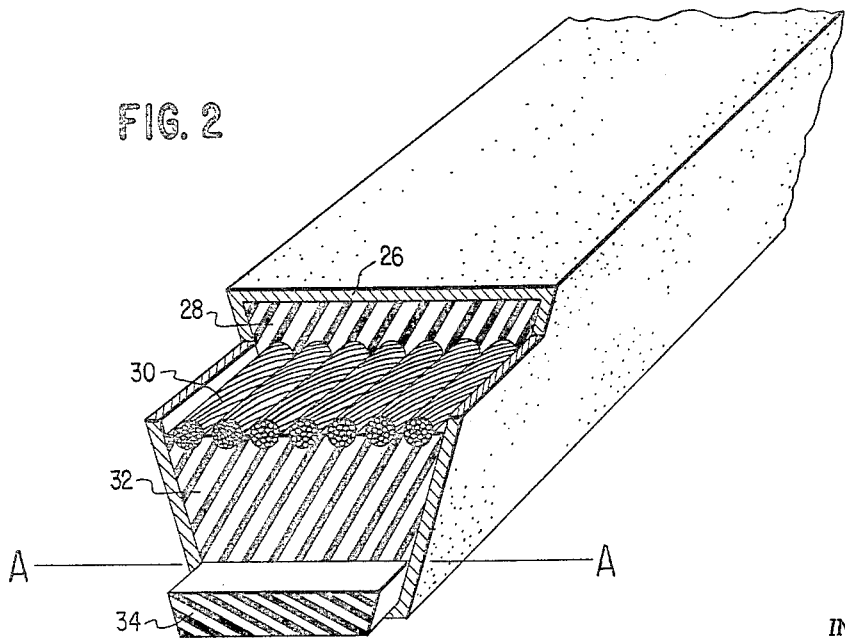
FIGURE 2 is a perspective view in section of a V-belt constructed in accordance with the present invention.

For purposes of illustration only, the belts of FIGURES 1 and 2 are shown with the larger bases of the belts uppermost.

The conventional V-belt of FIGURE 1 comprises a cover 10, an upper layer 12 of elastomeric material, a core 14 comprising a plurality of cords, and a lower elastomeric layer 16. Small cracks 18 tend to form in the lower base 20 of the belt. As the cracks propagate upwardly they enlarge as shown by reference numeral 22 as far as the core 14, and then may extend generally longitudinally causing longitudinal cracks or detachments illustrated by reference numeral 24.

The V-belt of the invention illustrated in FIGURE 2 comprises an external cover 26 made of one or more layers of rubberized fabric, an upper layer of wear resistant elastomeric material 28, a wear resistant core layer 30 including a plurality of cords, and two superposed layers 32 and 34 of elastomeric material with the bottom layer 34 being made of a softer material than that of layer 32.

The upper layer 28 may be made of an elastomeric material generally used in the construction of corresponding portions of conventional V-belts. However, in view of the very good performance characteristics which the belt of the invention should have, it is preferable for the upper layer 28 to be made of a rubber composition having the same hardness as the rubber composition forming the layer 32 intermediate the core 30 and the lower layer 34. The composition of the upper layer 28 should have a high stiffness which may be due for instance to textile fibers incorporated in the elastomeric material as described in Italian Patent No. 623,761 filed on Jan. 13, 1960, by the instant inventor.

The core 30 may be formed of a plurality of generally parallel cords of textile fibers such as rayon, polyester or polyamide fibers, metal wires, and glass fibers.

The intermediate layer 32 is composed of a rubber composition normally used in the formation of the body portion of conventional belts. As indicated above, such compositions have considerable hardness, higher than 65 Shore degrees, preferably in the range of from 75 to 80 Shore degrees, and in some cases up to 85 Shore degrees, instead of being in the range of 65 to 75 Shore degrees as in the past. The rubber composition forming the layer 32 has a conventional shape and is based on natural rubber, butadiene-styrene, polychloroprene, or other synthetic rubber, or a combination thereof, according to the desired type of belt and its intended use. The hardness of the composition is obtained and regulated by the addition of reinforcing fillers, in particular, carbon black, whose effect on the hardness of the composition is well known to those skilled in the art. It will of course be appreciated that an appropriate type of carbon black is selected to minimize the increase of hysteresis of the composition which is unavoidably caused by the addition of large amounts of carbon black.

The lower layer 34, which constitutes a principal feature of the invention, abuts the lower surface of intermediate layer 32 along a surface parallel to the two bases of the belt, which surface is represented in FIGURE 2 by the line A—A. The lower surface of layer 34 in the illustrated embodiment directly contacts the bottom portion of the cover 26. Or if no cover is employed, the lower surface of layer 32 constitutes the lower base of the belt. The thickness of lower layer 34 ranges from about 0.4 mm. to a value corresponding to about one half the height of the body of the belt, preferably said thickness is about 0.8–1 mm.

The function of layer 34 is to prevent the formation and growth of cracks and tears, which, as said above, tend to start on the lower base of conventional belts. To achieve its objectives, layer 34 is constituted of a rubber composition which, in addition to having the features of compositions used for making conventional belts, possesses the peculiar feature of having very good resistance to tear. This feature distinguishes the composition of this layer from compositions generally employed in the construction of conventional belts. The desired advantages of the invention are obtained by employing a composition which, besides having a lower hysteresis value and a very good resistance to aging, properties usually required for compositions used in conventional V-belts, has a hardness at least 10 Shore degrees less than that of layer 32. In view of these characteristics, layer 34 has low rigidity and, therefore, has good elongation and consequently very good resistance to tension and tears. Preferably, layer 34 has a hardness ranging from 40 to 65 Shore degrees.

Two examples of suitable elastomeric materials which may be used to form layer 34 are illustrated below in which all parts are parts by weight.

EXAMPLE I

| | |
|---|---|
| Natural rubber | 100 |
| Zinc oxide | 5 |
| Sulphur | 2 |
| Mercaptobenzothiazole | 0.5 |
| Diphenylguanidine | 0.3 |
| Antioxidant | 1 |
| Mineral oil | 2.5 |
| Stearic acid | 1.5 |
| MPC black | 35 |
| HMF black | 15 |

Characteristics:
| | |
|---|---|
| Modulus at 300% | 700 |
| Tensile strength gr./mm.$^2$ | 2500 |
| Ultimate elongation percent | 550 |
| Shore hardness | 60 |

EXAMPLE II

| | |
|---|---|
| SBR | 100 |
| Zinc oxide | 5 |
| Sulphur | 2 |
| Benzothiazoldisulphide | 1.5 |
| Diethyldithiocarbamate | 0.1 |
| Antioxidant | 2 |
| Mineral oil | 5 |
| MPC black | 30 |
| P33 black | 20 |

Characteristics:
| | |
|---|---|
| Modulus at 300% | 850 |
| Tensile strength gr./mm.$^2$ | 1950 |
| Ultimate elongation percent | 500 |
| Shore hardness | 55 |

It will be understood that the above examples are given merely by way of illustration, and that layer 34 may be formed of other types of synthetic rubbers alone or in combination with each other or with natural rubber and SBR rubber.

The V-belts of the invention may be constructed according to generally conventional processes. For example, the belt may be constructed by depositing the lower layer 34 upon a suitable building drum. The layer 32 may then be placed in position on top of layer 34, and the core wound up upon the preformed assembly of layers 32 and 34. Thereafter, the upper layer 28 is positioned on top of the core.

While the belt is still on the building drum, it is vulcanized. Subsequent operations relating to cutting and finishing the belt are carried out by procedures which are conventional in the art.

If the V-belt is to have a cover 26, one or more layers of rubberized fabric may be placed on the building drum as the first step of the construction of the belt. The other layers are then mounted as described above.

The preparation and vulcanization of the belt can also be carried out by placing the various layers constituting the belt onto the building drum in reverse sequence to that described above, that is, with the layer 34 being the last layer put in position.

Of course, the above described building up operation can be carried out on a drum capable of handling a number of belts (sleeves).

According to an alternate procedure for manufacturing the V-belt, the layer 34 constituted of the elastomeric composition of low hardness and the layer 32 constituted of the elastomeric composition of higher hardness can form a single semi-finished product, consisting of said two layers, doubled by means of a calender in accordance with techniques known in the art.

If desired, a V-belt of the invention may be provided with transverse grooves (not shown) in its inner portion in order to be more flexible and to more easily fit pulleys, particularly if these have a reduced diameter. The grooves may be obtained by assembling the individual layers forming the belt on a building drum provided on its outer surface with grooves disposed along its generatrices.

Another process suitable for carrying out said construction, is described in Italian Patent No. 735,338 filed on Aug. 4, 1964, by the present inventor.

The good operating performance and long service life of the V-belts of the invention have been demonstrated in both laboratory tests and in practical tests carried out in motor vehicles. In particular, resistance tests carried out employing three pulley testing machines of a type in accordance with SAE standards have determined the average life of V-belts of the invention to be 490 hours, as compared with an average life of 286 hours for a conventional V-belt. This constitutes an increase in average life of about 70% when following the teachings of the invention.

Tests carried out in motor vehicles established that the V-belts of the invention have an average life of 91,000 km. in comparison with an average life of 54,000 km. for a conventional V-belt, and have thus confirmed the good performance characteristics of the belts of the present invention.

What is claimed is:

1. A resistant and durable V-belt having a larger base and a smaller base and commencing at said larger base, (a) a layer of a wear resistant elastomeric composition, (b) a wear resistant core layer comprising a plurality of cords, (c) an intermediate layer constituted by an elastomeric composition having a hardness higher than 65 Shore degrees, and (d) a layer of an elastomeric composition having good resistance to tear and a hardness lower than 65 Shore degrees, the difference between the hardness of said intermediate layer (c) and that of said layer (d) being at least 10 Shore degrees.

2. A V-belt according to claim 1, wherein said elastomeric composition forming said intermediate layer (c) has a Shore hardness of 75–85 Shore degrees.

3. A V-belt according to claim 1, wherein said elastomeric composition constituting said layer (d) has a Shore hardness of 40 to 65 Shore degrees.

4. A V-belt according to claim 1, wherein said layer (d) has a thickness between 0.4 mm. and a value corresponding to one half of the height of the body of said belt.

5. A V-belt according to claim 4, wherein said layer (d) has a thickness ranging from 0.8–1 mm.

6. A V-belt according to claim 1, wherein said core layer (b) is constituted by cords selected from the group consisting of textile fibers, metal wires and glass fibers.

7. A V-belt according to claim 1, further comprising a cover comprising at least one layer of rubberized fabric enclosing said V-belt.

References Cited

UNITED STATES PATENTS

| | | | |
|---|---|---|---|
| 2,684,315 | 7/1954 | Spicer | 74—233 |
| 3,164,026 | 1/1965 | Terhune | 74—233 |

FRED C. MATTERN, JR., Primary Examiner

J. A. WONG, Assistant Examiner

U.S. Cl. X.R.

74—237